United States Patent [19]

Otten

[11] Patent Number: 4,593,361
[45] Date of Patent: Jun. 3, 1986

[54] VENDING MACHINE CONTROL CIRCUIT

[75] Inventor: David M. Otten, Newton, Mass.

[73] Assignee: PepsiCo Inc., Purchase, N.Y.

[21] Appl. No.: 648,789

[22] Filed: Sep. 7, 1984

Related U.S. Application Data

[62] Division of Ser. No. 431,613, Sep. 30, 1982, Pat. No. 4,481,590, which is a division of Ser. No. 159,625, Jun. 16, 1980, Pat. No. 4,372,464.

[51] Int. Cl.[4] ............................................. G06F 15/20
[52] U.S. Cl. ................................... 364/479; 194/217; 364/464
[58] Field of Search ............... 364/479, 478, 400, 188, 364/189, 184, 143–146, 464; 371/29; 222/638, 2, 23, 36, 136, 129.4; 221/2, 6, 9, 14, 21, 29; 194/1 N, 2, 3, 10; 340/825.35

[56] References Cited

U.S. PATENT DOCUMENTS

| | | | |
|---|---|---|---|
| 4,231,105 | 10/1980 | Schuller et al. ................ | 194/10 X |
| 4,237,536 | 12/1980 | Enelow et al. ................. | 364/479 X |
| 4,272,757 | 6/1981 | McLaughlin et al. ........ | 340/825.35 |
| 4,350,238 | 9/1982 | Shah et al. ..................... | 364/479 X |
| 4,354,613 | 10/1982 | Desai et al. .................... | 364/479 X |

*Primary Examiner*—Joseph Ruggiero

*Attorney, Agent, or Firm*—Scully, Scott, Murphy & Presser

[57] ABSTRACT

A vending machine control circuit having a plurality of capacitively coupled switches for enabling a customer to indicate his choice of a product to be vended. A logic circuit is responsive thereto for controlling the vending of products by the generation of vend signals directed to a plurality of vend solenoids. Out-of-product switches are wired in series with the vend solenoids such that if a solenoid is activated, but no current flows therethrough, a current sensing circuit is utilized to detect that the product is out-of-stock. This is a significant improvement over prior art control circuits, particularly from the standpoint of decreased wiring requirements in the vending machine.

The control circuit has an early power failure detecting circuit which allows critical tasks within the machine to be finished prior to removal of the power. This feature allows the machine to shut down in an orderly manner, and enables the totalizer to maintain track of sales even in the event of a power failure. Software within the processor directs the overall operations of the control circuit, including the vend operations, the coin receipt and dispensing functions, and also the cash and product totalizing functions.

3 Claims, 16 Drawing Figures

VENDING MACHINE CONTROL CIRCUIT

This is a divisional of co-pending application Ser. No. 431,613 filed Sept. 30, 1982, now U.S. Pat. No. 4,481,590, which is a division of Ser. No. 159,625 filed June 16, 1980, now U.S. Pat. No. 4,372,464.

BACKGROUND OF THE INVENTION

1. Field of the Invention

The present invention relates generally to a control circuit for a vending machine, and more particularly pertains to a rather advanced control circuit for a vending machine having significantly improved features over vending machine control circuits available in the prior art.

2. Discussion of the Prior Art

The prior art is replete with many designs for vending machine control circuits, most of which include significant quantities of hard wiring therein to accomplish their various control and record keeping functions. Furthermore, the control and record keeping functions were often very limited in nature because of the manner in which pricing decisions and vending controls were executed.

Vending machines generally known in the prior art have often used electro-mechanical devices, such as relays and the like, for control of the dispensing functions. A typical control sequence is initiated by the insertion of coins into a coin mechanism which delivers a switch closure signal when sufficient coins have been inserted to vend a product. The credit signal is stored in an electromechanical relay. While storing the credit signal, this relay may close a circuit which provides power to a number of selector switches which can then in turn be operated to cause other relays to energize the mechanisms dispensing a product. Provisions are made in the circuitry so that only one selection can be made by the customer for every credit signal supplied by the coin mechanism, and a selection then cancels the stored credit signal.

The electromechanical devices which provide the necessary logic for operation of a vending machine of this nature are subject to many shortcomings. The mechanical parts are subject to wear, and require frequent adjustments. The correct operation of the system depends upon all parts functioning in a close timed relationship. The relatively slow moving mechanical parts frequently do not stay in a correctly timed relationship and may lose the established credit, resulting in a loss of money to the customer. A loss of the timing function may also fail to cancel credit after a selection has been made, resulting in a substantial loss of revenue to a merchant. Another problem arising from the slowness of the mechanical parts is that in some instances it is possible to "trap" the credit signal and effect the release of merchandise in excess of the amount equal to the established credit by manipulation of the electrical power applied to the machine or by rapid operation of the selector switches, or by other physical abuses of the machine causing shock and/or vibrations to the various mechanisms.

The prior art also discloses many multi-price vending control circuits sometimes called changers which control product delivery and also make change or refunds. Some of the known devices also have some price selectivity and other capabilities such as providing escrow, product selection, refunding and so forth. Control circuits are also known which make comparisons between amounts deposited or otherwise entered in a machine and a vend price. However, many of these prior art arrangements do not provide a vending control circuit which is able to provide almost unlimited price and product selection and at the same time control the product delivery and other control functions using relatively simple circuit and wiring arrangements.

Several of the known circuit arrangements have included various electronic and other types of accumulator means in their vending and refunding portions, and have also employed logic circuitry for various purposes. However the present control circuit, while performing many functions performed by known control circuits, constitutes a new generation of such circuits which substantially enlarges the operating capability and flexibility of such circuits and includes features including particularly logic and memory circuit features which are different from anything known or available in the prior art.

In greater particularity, Lee U.S. Pat. No. 4,034,839 discloses a vending and price selection control circuit in which selection switches are actuable by a customer to produce one of a plurality of possible vends at different vend prices. Control and logic circuitry enter pricing information, apply power to a selected vend operator member, and also perform other vend and refund functions. The control circuit includes a coin switch or other type of credit entry unit, a payback switch circuit, a pulse generator circuit, and a comparator circuit. The comparator circuit includes a first accumulator portion in which amounts are totalized representing deposits made during each vending operation, and a second accumulator portion which is the pricing portion in which the vend price of a selected item or service is entered. The second accumulator also has amounts entered equal to the value of each coin refunded during a payback operation. Pricing entries are in the form of binary price codes in this disclosed arrangement.

Douglass U.S. Pat. No. Re. 28,749 discloses a control circuit for a vending machine which includes an input portion having coin actuated nickel, dime and quarter switches. A cam activated payback switch is also provided, and is located near the payback motor. The coin switches are connected to input terminals of associated logic circuits. Entries are made in binary form in an accumulator after passing through associated logic gating circuitry therein. The specification of this patent states that the entire circuit can be constructed of a few IC chips, some, if not all of which are available as off-the-shelf items.

SUMMARY OF THE INVENTION

Accordingly, it is a primary object of the present invention to provide an improved control circuit for a vending machine.

Another principal object of the present invention is the provision of an improved and more versatile control circuit for vending and other coin or check controlled machines.

Another object of this invention is to provide a relatively inexpensive and versatile vending control circuit which substantially reduces the number of circuit components and wiring connections therefor required in its construction. In greater particularity, it is an object herein to substantially reduce the amount of wiring and circuitry required to detect an out-of-product condition for a vending column in the machine. It is known in the prior art to place a small mechanical switch adjacent to each vending column to sense an out-of-product condition therein. An arrangement of this nature normally requires separate wires to each switch to sense an out-of-product condition and cause a corrective action to be taken therefor. The present invention proposes an arrangement to eliminate a great deal of this wiring. In accordance with this aspect herein, each out-of-product switch is placed in series with a vending actuator such as a vending solenoid. An open switch is indicative of an out-of-product condition, and a common current sensing circuit for all of the vending actuators senses the absence of current to the actuator when an enabling signal is supplied thereto.

A further object of the present invention is to provide a control circuit for a vending machine having a logic circuit including a processor and vending programs stored therein to control the vending machine in a number of different operational modes. In further detail, the vending programs comprise a main program having a number of subroutines including a coin mechanism subroutine, a selection switch subroutine, a payout switch subroutine, a test vend subroutine, a price setting subroutine, a set special subroutine, an illumination subroutine and a security alarm subroutine.

In accordance with a preferred embodiment of the present invention, a vending machine control circuit is disclosed having a plurality of switches for enabling a customer to indicate his choice of a product to be vended, and a logic circuit responsive thereto for controlling the vending of products by the generation of vend signals. A plurality of vend actuators are responsive to the vend signals to actuate the vending of products stored in the machine. In accordance with one aspect of the preferred embodiment, a plurality of out-of products switches are provided, one for each vend actuator and wired in series therewith. Each switch is opened by the absence of product for that vend actuator, and prevents current from flowing through its associated actuator when an out-of-product condition exists. A common current sensing circuit for all of the vend actuators detects current flowing through each actuator when it is activiated by said logic means. The absence of current flowing through a vend actuator when a vend signal is generated therefor indicates the out-of-product switch associated therewith is open and an out-of-product condition exists. Furthermore, in the preferred embodiment, each vend actuator is a solenoid, and the common current sensing circuit includes a current threshold circuit for detecting when an electrical current is flowing above a given threshold valve. The logic circuit supplies a current pulse having a predetermined short time duration to each solenoid, with the time duration being sufficiently short such that it does not actuate the vend solenoid and result in vending of a product. However, the pulse enables an open condition of the out-of-product switch associated with the solenoid to be detected by the absence of a short pulse of current flowing through the solenoid.

In accordance with another aspect of the present invention, the logic circuit includes a memory for storing therein totals representative of the total number of vends of each type of product and totals representative of the cash received by the vending machine. The logic circuit also includes a processor for controlling the operation of the vending machine and a power supply therefor. A detecting circuit is provided for detecting an interruption in the power supply for the logic circuit, and the processor is responsive to the detecting circuit to interrupt its processing of signals to prevent an erroneous entry of one of said totals into memory. Furthermore, a separate battery power supply is provided for the memory to enable the storage therein of the totals during an interruption in the main power supply for the logic circuit. In greater detail, an AC power supply is provided for the vending machine, and the detecting circuit includes a capacitor coupled across the AC power supply. The capacitor is almost discharged below a threshold level on each half cycle of the power supply, and a threshold detector detects a discharge of the capacitor below the threshold level.

In accordance with another aspect of the preferred embodiment, the control circuit includes isolation circuit elements coupling the logic circuit to the plurality of vend actuators. A plurality of optically coupled isolators is provided, one for each vend actuator, for isolating the logic circuit from the power supply driving the actuators. Furthermore, a plurality of triacs are provided, one for each optically coupled isolator, and each triac is responsive to a signal therefrom to generate a driving signal for a vend actuator.

In accordance with yet another aspect of the present invention the plurality of selection switches are provided by a switch panel having a plurality of capacitively coupled switches thereon. A strobe generator is responsive to actuating signals from the logic circuit to generate strobe signals for the switch panel. The logic circuit includes a parallel to serial shift register, responsive to actuating signals from the logic circuit, for entering the status of the plurality of capacitively coupled switches therein. Furthermore, a common potentiometer is coupled to all of the plurality of capacitively coupled switches to adjust in common the amplitude level of signals entering the shift register from each of the plurality of switches. Further, a strobe generator is responsive to actuating signals from the logic circuit for generating strobe signals for the plurality of capacitively coupled switches, with the amplitudes of the strobe signals being adjusted by the common potentiometer. The logic circuit also includes a processor for serially processing the data entered therein from the plurality of switches. The serial examination of the data precludes the pushing of two selection switches simultaneously by a customer having an erroneous effect on the operation of the machine. In accordance with another feature, the processor latches the data from the plurality of switches into the shift register during the strobe signal a given amount of time after the leading edge of the strobe signal is generated to minimize errors in the processing of the data.

In accordance with a further aspect of the present invention, data is entered into the memory in an unusual manner which includes a switch accessible to a serviceman for calling from memory a program which enables routine controls on the vending machine customer control panel to be used in a nonroutine manner for the entry of data. The routine controls include the coin return switch which increments the price displayed on the available credit display each time it is activated by the serviceman, and the product selection switches which enter into memory the price displayed on the credit display as the vend price for a particular product when the product selection switch for that product is activated.

Furthermore, the processor includes a data clock, and the existence of an out-of-product condition is entered into memory along with the time of sensing thereof as indicated by the clock, whereby a record is maintained of the amount of time a machine is out-of-product. The control circuit also includes a first power supply for the logic circuit and a second power supply for the memory, including a battery, to enable the memory to retain accurate totals therein during an interruption in power of the first power supply. Further, the processor has a number of vending routines stored therein including a special routine to enable a customer to select a vend of several products by the activation of a single product selection switch.

BRIEF DESCRIPTION OF THE DRAWINGS

The foregoing and other objects and advantages of a novel vending machine control circuit constructed pursuant to the teachings of the present invention may be ascertained more fully from the ensuing description of a preferred embodiment thereof, taken in conjunction with the accompanying drawings, wherein.

DETAILED DESCRIPTION OF THE DRAWINGS

Figure 1:
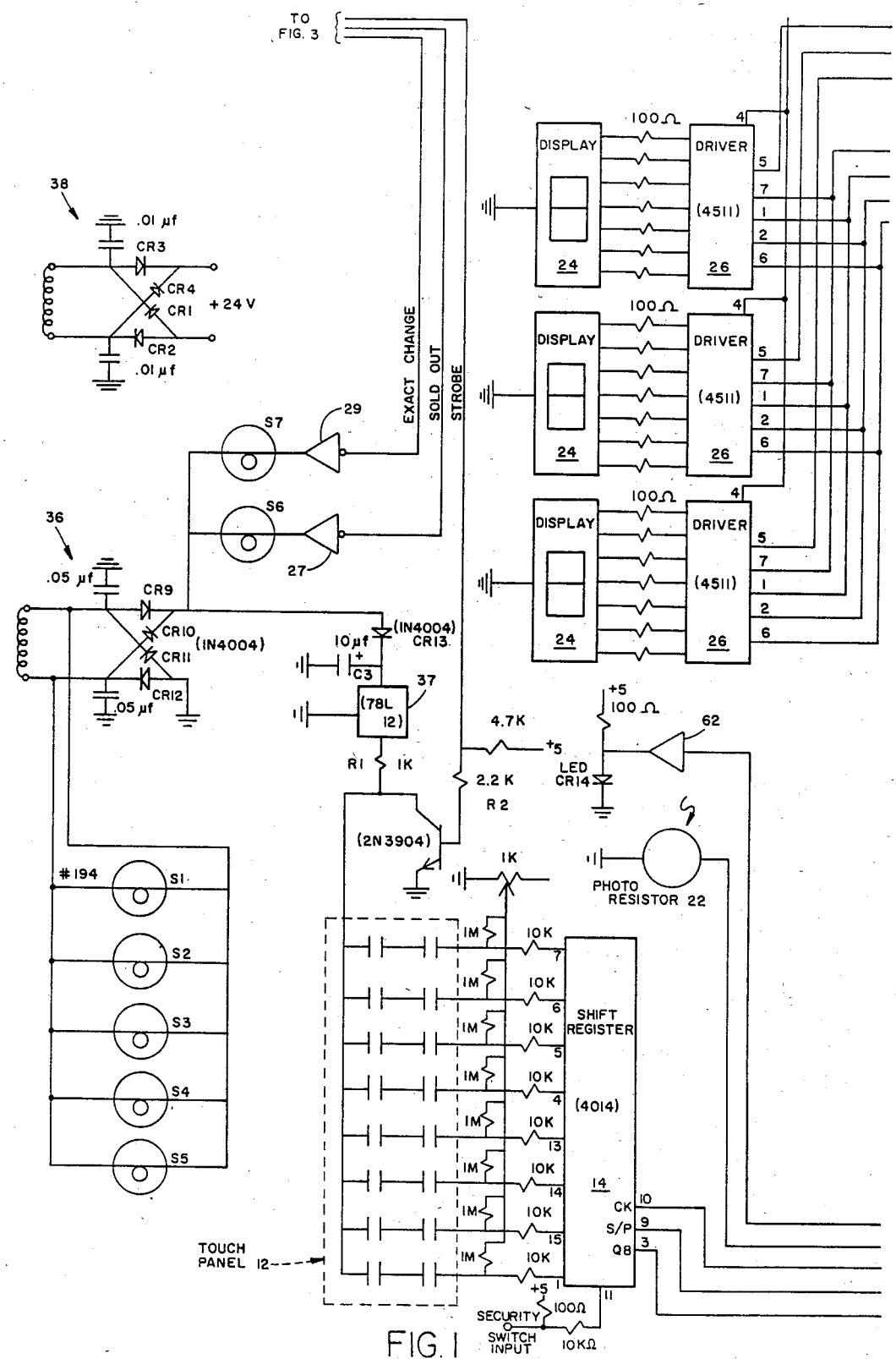
FIGS. 1, 2, 3 and 4 are all parts of one schematic diagram for the control circuit, with FIG. 1 forming the lower left portion thereof, FIG. 2 being the central portion thereof, FIG. 3 being the right portion thereof, and FIG. 4 forming connections with FIG. 2 as indicated.

Referring to the drawings in detail, a vending machine control circuit is disclosed which may be functionally divided into several different sections, an input section, a display portion, a vend section, power supplies, and a totalizer section.

The input section of the circuit manages a capacitive touch panel which records customer selections. The display portion handles the credit display, exact change indication, and out-of-product indications. A vend section controls the payout of the product and the sensing of an out-of-product condition. Power supplies provide electrical power for the control, display, coin mechanism logic, and change payout solenoids. A totalizer portion of the circuit maintains records of the different operations of the control circuit. The operations of the different sections are coordinated and controlled by a main processor and software entered therein. The operation of each of the sections will be explained individually herein.

The commercial designations of the various chips included in one embodiment of the present invention are indicated in parentheses in the drawings, along with the appropriate pin numbers for connections to the chips. Also, functional symbols for the pins, such as CK for clock and S/P for serial/parallel, are included where they are believed to aid in an understanding of the circuit.

Figure 2:
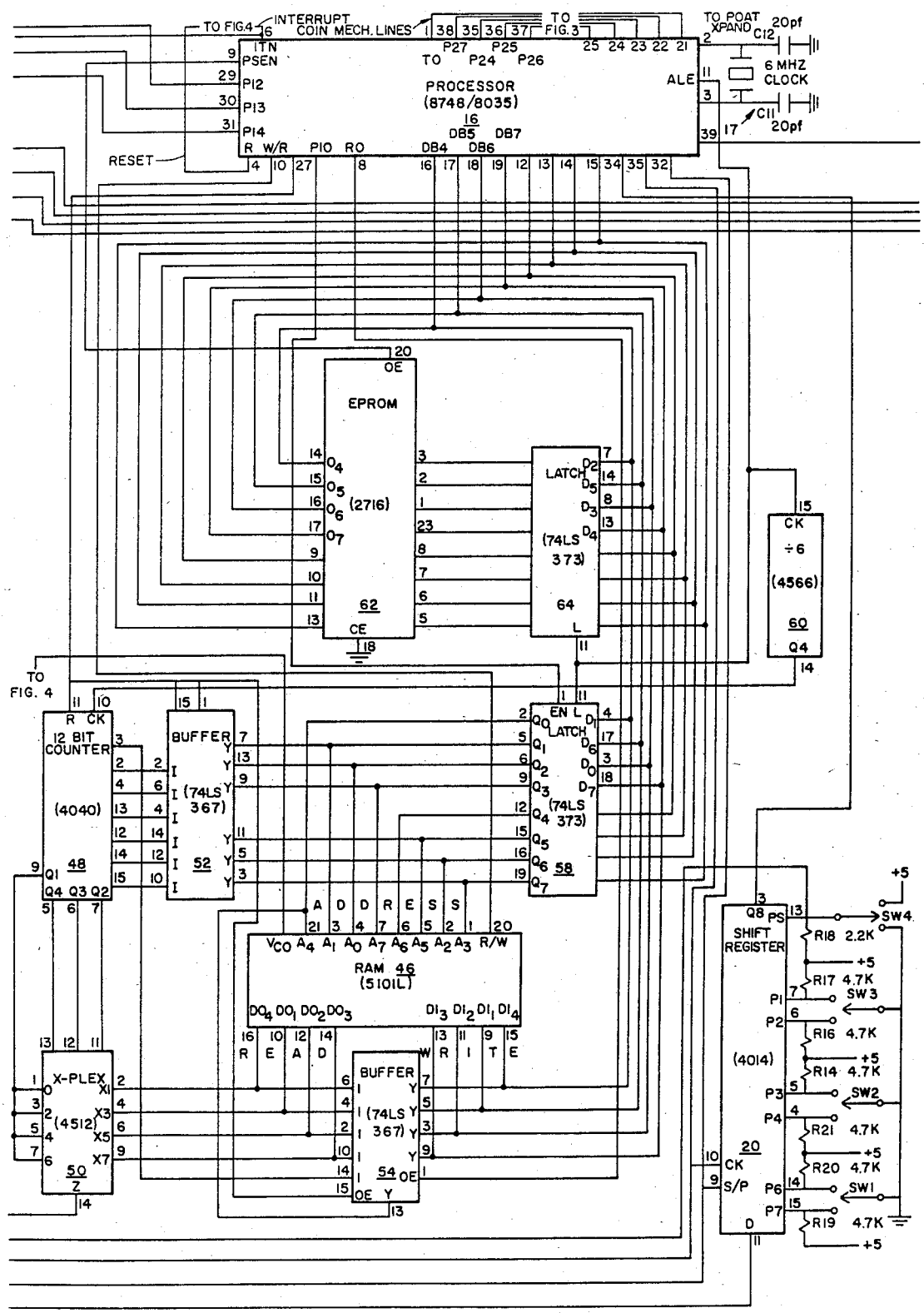
Figure 3:
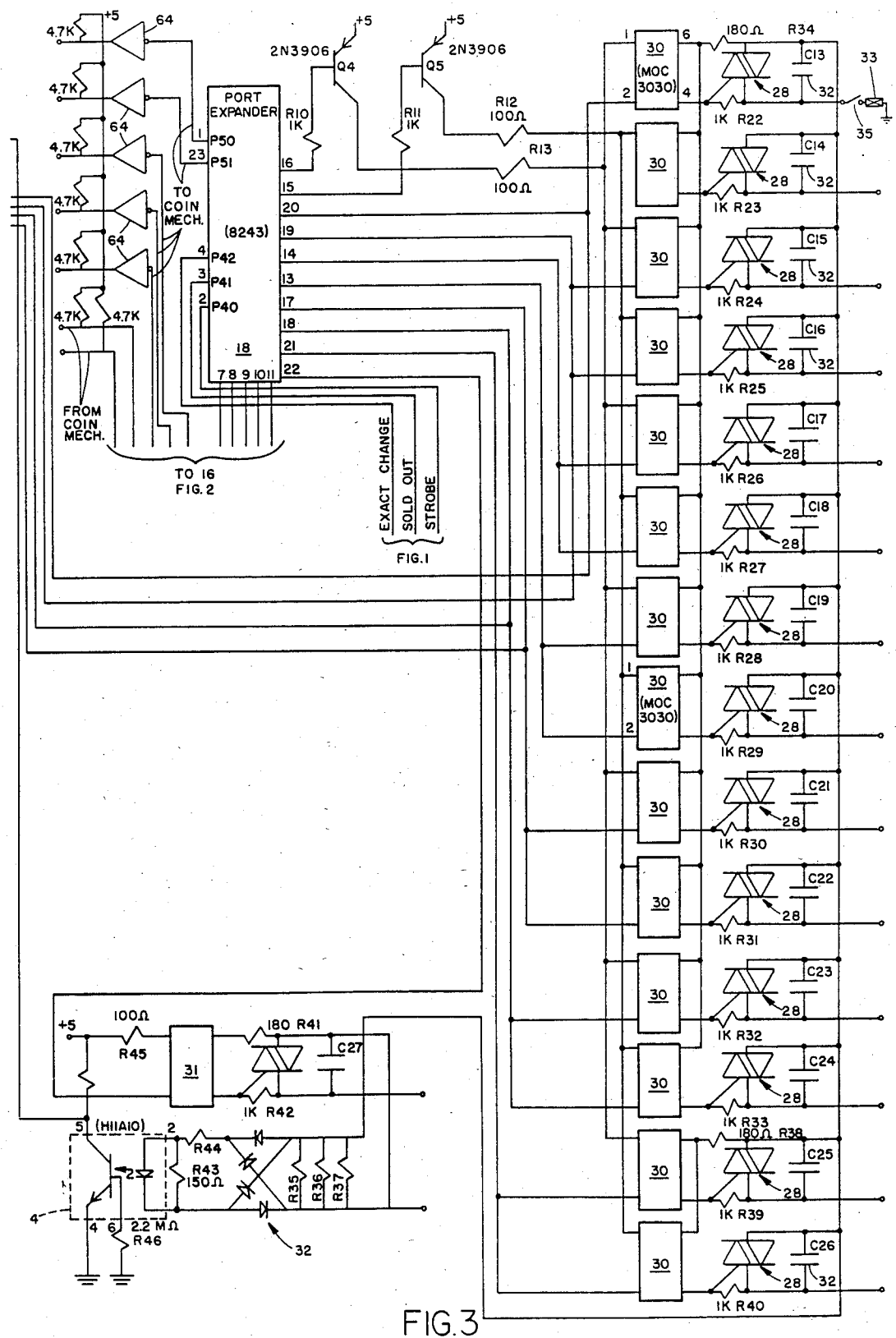
Figure 4:
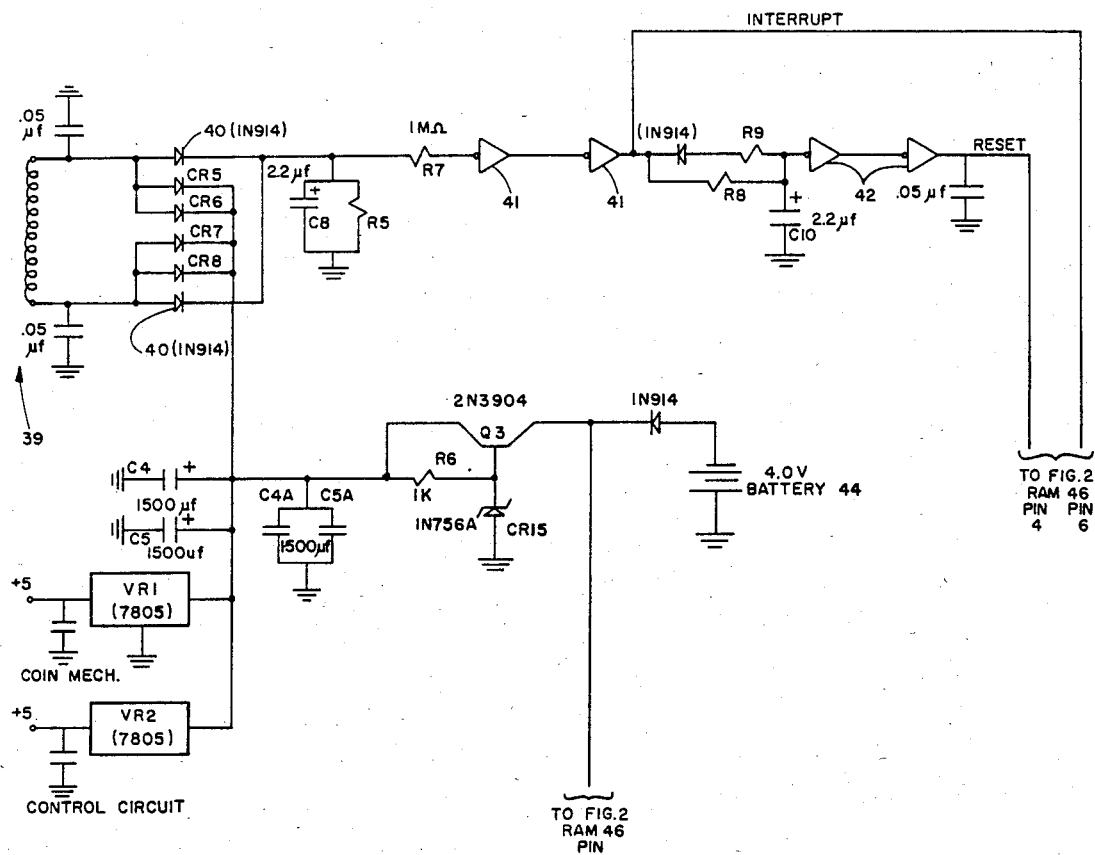

FIGS. 1, 2, 3 and 4 are all parts of one schematic diagram for the control circuit with: FIG. 1 forming the left portion thereof; FIG. 2 being the central portion thereof; FIG. 3 being the right portion thereof; and FIG. 4 forming connections with FIG. 2 as indicated. It is suggested that FIGS. 1 through 3 be reassembled as indicated above to enable the reader to follow the explanation of the control circuit.

Figure 5:
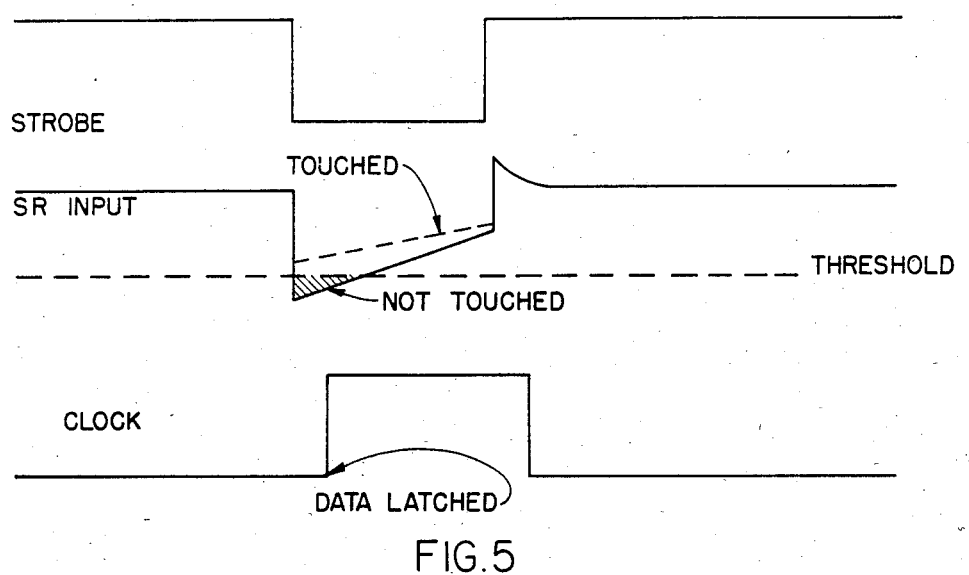
FIG. 5 illustrates strobe and data waveforms associated with entry of data from the capacitive coupled switching panel into a shift register.

The input section of the circuit comprises a touch panel 12 connected to the parallel load inputs of a shift register 14. The touch panel is connected to the shift register through 10K ohm series resistors to protect the register chip from transient signals. As illustrated in FIG. 5, the input signals to the shift register 14 are biased slightly above the high threshold thereof with 1M ohm resistors. The 1M ohm resistors are connected to ground through a common 1K ohm potentiometer to enable all of the exact threshold levels to be adjusted in common. All eight capacitive touch switches in the panel 12 feed into a single shift register 14. This is an important feature because the threshold of all of the inputs should be the same so that only one adjustment via the 1K potentiometer is needed, and all of the thresholds for different inputs tend to be the same within a single chip. Also with the CMOS process used herein, the thresholds tend to be constant with temperature which is important for all weather use of the control circuit.

A 12 volt strobe signal to the touch panel is generated by a 2N3904 transistor. The base of the transistor is coupled to the processor 16 through a port expander chip 18, and the processor controls the timing of the strobe pulses, turning the transistor on to create a periodic negative strobe signal to the panel. When a particular capacitive switch in the touch panel is touched, the strobe signal is effectively shorted to ground. In other words, those capacitive switches in the touch panel that are being touched prevent the strobe signal from taking the input to the shift register for that particular switch below the threshold level. Those capacitive switches in the panel that are not touched allow the strobe signal to take the input to the shift register below its threshold level. The parallel input to the shift register is latched therein by a clock pulse on input pin 10, and then serially shifted out to the processor later on pin 3 by an appropriate command signal to pin 9. The serial data out of shift register 14 is entered into a second shift register 20 prior to being transferred into the central processor 16. In this arrangement, the processor applies simultaneous clock pulses to both registers 14 and 20 on the input pins 10 thereof, and this results in the data first being transferred into register 14, then into register 20, and lastly into processor 16.

After the data from touch panel 12 is latched into the shift register 14, the transistor generating the strobe signal is turned off to remove the strobe signal. The power supply for the transistor does not have to be very large because the strobe signal is only on for a short period of time. Logic within the processor 18 provides that sixteen consecutive samples of the touch panel signals must be the same before the signal is accepted and acted upon. This feature ensures that stray capacitance which might affect the individual capacitive switches in the touch panel do not adversely impact upon the performance of the control circuit. Accordingly, the system is biased so that a change of status is not recognized until there is a strong indication thereof.

The shift register 20 also has four control switches SW1 through SW4 coupled to its inputs which enter control functions into the processor. A first switch controls the payout of nickles and dimes. A second switch controls the payout of quarters, and also activates a test mode program in the controller. A third switch activates the price setting mode of the controller, or selects a special vend mode in the controller. The fourth switch is used to control the lamp in the door of the vending machine. The lamp can be turned on all of the time, off all of the time, or can be controlled by the ambient light incident on a photodetector 22 as explained infra. The status of all of the switches is latched into the shift register 20 in the same manner as the signals from the touch panel 14 and is then shifted into the processor 16. This system requires a minimum number of processor ports for processor 16, costs very little for each additional bit of data added, and makes the layout of the printed circuit board relatively easy since only three wires are required between each shift register and the processor 16.

The port expander circuit 18 is a commercially available chip which is utilized to expand the number of output terminals or ports of the central processor 16 by switching the output signals from a lesser number of output ports on the processor to a greater number of output ports on the expander chip. The switching function of the expander chip is performed in accordance with output signals received thereby from the processor 16 which controls the switching functions. The processor 16 is illustrated as being driven by a 6 MHz crystal clock 17 in a manner as is conventional in the art.

The display section consists of one passive and three active components. A three digit LED seven segment display shows the credit that is available in the machine. When the credit is zero the display is blanked to conserve power and avoid customer confusion. Each seven segment digit 24 of the display is driven by a 4511 CMOS latch and digit driver 26. The drivers 26 are connected in common by input pins 7, 1, 2 and 6 thereof to a four bit output port from the port expander chip 18 defined by output pins 17 through 20 thereof. Each driver 26 has an individual latch line directly from the processor 18 to pin 5 thereof to latch only data into a chip 16 that is valid for that particular chip. The current into each seven segment LED display is controlled or limited by seven 100 ohm resistors. At 20 milliamps per segment, each seven segment display consumes 140 milliamps when all segments are on, and accordingly the power saving is substantial when the displays are blanked.

An incandescent light bulb S6 driven by a buffer gate 27 indicates when a product is out-of-stock. The circuit has only one indicator light for all out-of-stock conditions, instead of the usual one indicator for each product, for reasons which will be discussed infra. The bulb is lighted only when the switch for an out-of-stock product is actually touched. This arrangement eliminates a substantial amount of circuitry and wiring compared to conventional systems. A second incandescent light bulb S7, driven by a buffer gate 29, is also used to indicate when exact change is required for a purchase. Because the machine is capable of multiprice vending (each product may have a different price), it is not possible to determine in advance if a product requires exact change. Therefore the light is activated only when the switch is being touched for a product requiring exact change.

In addition to the signal lights discussed above that are turned on and off in response to give conditions within the vending machine, a number of lamps S1 through S5 remain on all of the time to illuminate messages on the front panel of the machine. These messages include price, instructions, and perhaps certain types of promotional messages. These lamps are driven directly from the AC power supply to the machine as no DC is required therefor.

The vend section is composed primarily of fourteen optically coupled triacs 28. Optical coupling is provided by commercially available isolator MOC3030 chips 30, and is used to isolate the control voltage of the control logic from the high voltage used to drive the vend solenoids. Optical isolation achieves total isolation between the components and enhances the safety of the controller. The commercially available isolators also have circuitry to provide the characteristic that they turn on only when the AC voltage applied thereacross is at or near zero, and accordingly they will not turn on during positive and negative portions of the AC cycle. This characteristic of turning on only when the voltage is near zero eliminates the high frequency noise generated when a load is connected to the line at full voltage. Because the isolators allow the triacs to turn on only at low voltages, a resistor is not required in series with a capacitor across the output of the triac in the power triac snubber. Each triac is provided with a capacitor (C13 through C26) which is very effective in limiting the dv/dt of the triac if no resistor is included in series with it (as is usually the case in prior art utilization of triacs wherein a resistor is normally included to limit the current through the triac from the capacitor when the triac is turned on near a voltage peak).

The fourteen optically isolated drivers 30 are driven by a 2×7 control line matrix arrangement from the port expander 18 under control of the processor 16. Each of the 7 rows are driven by one line from the processor port expander 18, and the two columns are driven by two 2N3906 transistors, which are in turn driven also by the port expander 18. This matrix arrangement reduces from fourteen to nine the number of pins required from the port expander without introducing a significant number of additional discrete components.

A current sensor 32 is formed of three 1 ohm current sensing resistors R35, R36, and R37 in parallel and an opto-isolator 34. The signal from the sensing resistors is recified by a full wave bridge consisting of four diodes, and then forms an input to the opto-isolator 34. This arrangement enables the circuit to detect current in both directions even though the opto-isolator only conducts current in one direction. In this arrangement, a flow of current through the LED in the opto-isolator 34 causes illumination of the radiation sensitive transistor therein, turning it on. This results in a flow of current through the resistor coupling the collector of the transistor to +5 volts, causing the voltage at the collector to drop the threshold of pin 39 of processor 16, thereby communicating this information to the processor. The vend solenoids 33 of the vending machine require a great deal of current when they are initially actuated, but the current, approximately 8 amps, is reduced to 1.5 to 2 amps when the solenoid actually closes and the product is vended. The current sensor 32 is adjusted to detect the high current, but will not respond to the low steady-state value thereof. If a vend solenoid is jammed in its open position, then the current will not decrease from its initial value. This condition can be sensed with the current sensor, and an alternative action taken by the processor. Like many vending machines in the prior art, a microswitch 35 is provided near the bottom of a column of products to be vended to detect when the column is empty, with the switch being opened by that condition and closed when product is present. A unique feature of the present invention is that the out-of-product switches are wired in series with the vend solenoids. If a solenoid is activated by the control circuit and the product column is empty, no current flows through the solenoid because of the open microswitch, and accordingly the current sensor can detect that the product is out-of-stock by detecting zero current when a vend solenoid is activated. This is a very significant feature of the present invention as it allows the control circuit, with only one wire for each mechanism, and one common wire, to be able not only to vend but also to detect if the product is out-of-stock or if the column is jammed. This feature results in significantly less wiring being required to accomplish the vend and out-of-stock detection functions than similar prior art machines.

The status of photodetector 22 is entered into shift register 20, and then into the processor 12. The illumination of the front panel of the machine may be turned on by turning switch SW4 to the +5 volt contact, or be turned off by turning the switch to the ground contact, or can be controlled by ambient illumination by photoresistor 22 by leaving the switchable contact in the middle position as illustrated in FIG. 2. The resistance of photoresistor 22 increases with darkness, and photoresistor 22 and resistor R18 are arranged in a voltage divider network coupled to +5 volts. Accordingly, as the resistance of the photoresistor 22 rises with incipient darkness, the voltage at pin 13 will rise to above the threshold of the shift register, and the logical one entered into the shift register will cause the processor to turn on the illumination for the vending machine front panel. Based upon the level of ambient illumination sensed by the photodetector, the processor issues an actuation command on pin 22 to an optically isolated driver 31 which in turn actuates its associated triac to energize the front panel illumination of the vending machine during night-time hours.

The power supply section consists of three main power supplies. All three power supplies are fed from appropriated taps of a single transformer coupling the inputs to the power supplies to 110 AC through the transformer.

The first is a 12 volt unregulated, unfiltered power supply 36 for the lamps, including an AC power supply directly from the transformer for those lamps S1 through S5 that are not activated by the control circuit and a DC power supply through a full bridge, having diodes CR9 through CR12, for those lamps S6 and S7 that are activated by the control circuit. This power supply, regulated by voltage regulator 37, also supplies a regulated 12 volts DC to transistor 2N3904. The second power supply 38 is an unregulated and unfiltered 24 volt supply that is used to power the payout solenoids, with only the pin connections being shown in the drawing. It is rated at a minimum of 24 volts at 3 amps and has a low duty cycle since change payout is infrequent. Even when operating, the payout solenoids are only energized 15% of the time.

Figure 6:
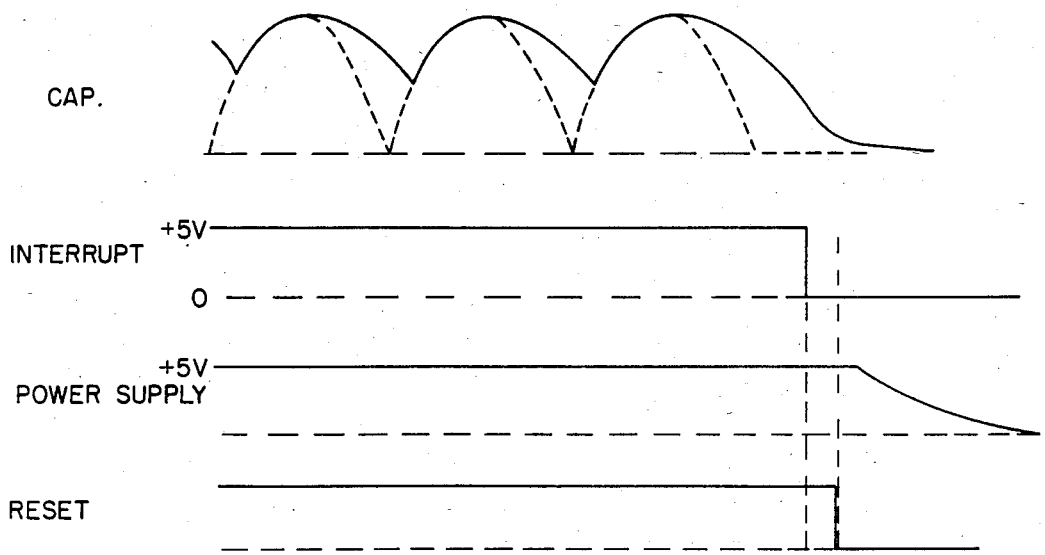
FIG. 6 illustrates power supply waveforms associated with a power interruption.

The third power supply 39 is for the logic within the control circuit. The transformer supplies power to a full wave bridge consisting of diodes CR5 through CR8, and the current passing therethrough charges two 1,500 uf capacitors. Two five volt regulators VR1 and VR2 are also included, one for the coin mechanism and one for the control circuit. An early power failure detecting circuit is incorporated into the third power supply. The signals as a function of time during a power down are shown in FIG. 6. The output of the bridge passes through two signal diodes 40, and is then filtered by a 2.2 uF capacitor C8. A bleeder resistor R5 is connected across the capacitor and almost discharges C8 on every half cycle of the 60 Hz supply. If the power were interrupted for only a single cycle, the capacitor would discharge. The capacitor voltage is coupled through a 1M ohm resistor to several buffer gates 41 to buffer the impedance of the signal and convert it to a digital signal which then interrupts the processor by the signal to pin 6 thereof. The gates 41 function in the manner of Schmidt trigger circuits. The signal then passes through an R-C delay circuit formed by R8, R9 and C10 to two additional gates 42. This arrangement generates a timed signal to reset the main processor quickly if the power fails, but removes the reset signal slowly when the power is restored. The circuit ensures that the processor does not operate when the power supply is the least bit questionable. The circuit also provides the processor with an early warning that the power is about to fail, and allows it time to finish any time critical tasks before the power is removed. One critical task performed by the processor is to maintain the totalizing functions accurately to maintain the records of sales of the machine.

If the AC power supply is removed, a 4 volt battery back-up power supply 44 is provided for the Random Access memory (RAM) 46 that stores all of the totals. In a preferred embodiment, this memory is a CMOS type of chip that typically draws less than 10 uA of current in a standby state. The power failure signal generated by gates 42 to the processor is also utilized thereby to control this chip and put it into the power-down mode when the AC power is removed. A reverse biased base-emitting junction of a 2N3904 transistor prevents the battery from discharging by also backfeeding the rest of the control circuit. When the AC power is on, the transistor supplies the memory with a 5 volt regulated power supply, regulated by a zener diode CR15. A 1N914 diode prevents the transistor from charging the battery when the batteries used in the control circuit are not capable of being recharged.

The totalizer section includes a CMOS RAM 46, a 12 bit counter 48, an eight input multiplexer 50, buffers 52 and 54, and a latch 58. The memory is arranged as a dual port memory, with one port being coupled to the processor, and one port being coupled to an LED CR 14 that is used to serially transmit information from the machine. The ADDRESS lines of chip 46 can be driven from either latch 58 with an address provided by the processor, or from Buffer 52 with an address provided by a 12 bit counter 60. The processor controls which address is used for the memory. The output of the memory is connected to multiplexer 50 which passes the signals through pin 14 through buffer gate 62 to drive LED CR14. LED CR14 is positioned to be viewed externally of the vending machine, and is digitally driven to serially present the information in memory 14 such that the information may be recorded with an appropriate photodetector, coupled to memory, placed adjacent to the LED. This feature allows service personnel to record pertinent monetary and dispensing totals for the machine in a very convenient manner without ever having to open the machine. The output of the memory is also connected to buffer 54 which, upon command from the processor, couples the output of the memory 46 to the processor. In this arrangement, when the processor 16 controls memory 46, data can be entered into the memory directly from the processor on pins 9, 11, 13 and 15, with the processor supplying the correct address through latch 58, or data can be read from the memory through buffer 54, with the address being supplied in the same manner. When the processor is not in control of the memory 46, data in the chip 46 is continually read out with the address supplied by counter 48 through buffer 52, with counter 48 causing a sequential cycling of the addresses to the memory. A divide-by-six circuit 60 divides the clock output of the processor clock 17 by six to obtain a 1 MHz clock signal to drive the counter 48. The four output bits of memory on pins 10, 12, 14 and 16 are read in sequence by multiplexer 50 in a manner that, at each memory location, each bit of the memory is sequentially outputed to the LED CR14. Since the readout operation is handled automatically by hardware in this manner, it does not take any action by the processor and frees it for other tasks.

The processor section consists of an 8035 single chip processor 16 supplemented by 2K of Erasable Programmable Read Only Memory (EPROM) provided by chip 62. The address for the EPROM 62 is latched from the data lines by an octal latch 64. Both EPROM 62 and latch 64 can be eliminated if the processor chip 8035 is replaced by a masked version an 8049 chip which has the additional 2K of memory inside the chip. An expander port chip 18 has also been added to expand the output ports of the processor. The high drive capability of the port expander chip 8243 makes it particularly suitable to interface with the optically isolated triac drivers which require 30 milliamps of current.

The coin mechanism interface consists of seven lines, five output lines from the controller and two input lines to the controller. The coin mechanism may be a commercially available product, such as that supplied by Mars Money Systems, Folcraft Pa., which has a serial data interface with other portions of the logic circuit. The five output lines are coupled to pins 35, 36 and 37 of the processor 16 and pins 1 and 23 of the port expander 18, and the two input lines are coupled to pins 1 and 38 of the processor 16. The output lines are buffered by gates 64 to provide maximum drive and noise immunity. Both the output and input lines are pulled up to plus 5 volts with 4.7K ohm resistors to enhance the high output drive capability of the output buffers and provide a default logic position when the coin mechanism is not connected. The data is serially transmitted between the coin mechanism and the controller to minimize the number of required interface wires which keeps the cost low and also enhances the reliability of the machine by providing fewer interconnects.

The interface with the coin mechanism contains a total of eleven wires, two for the 24 volt power supply, two for the 5 volt power supply, and seven data lines including two input lines and five output lines. The input from the coin mechanism into pin 1 of the processor is an interrupt line, the signal on which alerts the processor to some type of activity at the coin mechanism. The input from the coin mechanism into pin 38 of the processor is the data input line on which serially transmitted data informs the processor of the exact nature of the activity at the coin mechanism. The four output lines to the coin mechanism direct it to operate as follows. Three of the output lines activate the payout solenoids, one each for five cents, ten cents, and twenty-five cents. One output line inhibits acceptance of coins by the coin mechanism. When there is activity in the coin mechanism, e.g. a coin is received, the mechanism signals the controller on one of the input lines to the controller, an interrupt line. The controller then serially clocks information, one bit at a time, from the other, or data, input line to the controller. The data input line carries information of the type of coin received, whether the coin return was depressed, and the change in the coin mechanism.

Figure 7:
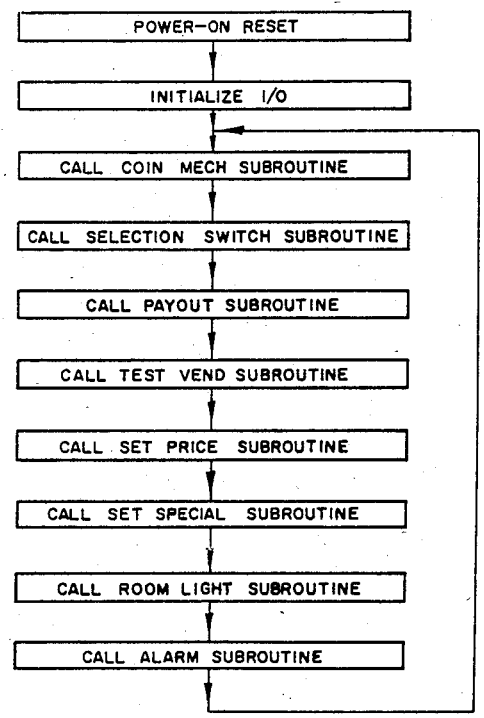
FIG. 7 is a logic flow diagram of the main program for running the microprocessor of the control circuit.

The software for the processor is illustrated in terms of flow diagrams in FIGS. 7 through 16. The main program is illustrated in FIG. 7, and is written in terms of subroutines, the flow diagrams for which are shown in FIGS. 8 through 16. When power is applied to the processor, it resets the same and initiates the main program therein. The program first initializes or clears the inputs/outputs to the vending machine and the logic therein, turning the credit display off, turning all of the vend solenoids off, and setting the counters in its logic to zero with the exception of the record totals for the machine maintained in RAM 46.

Figure 8:
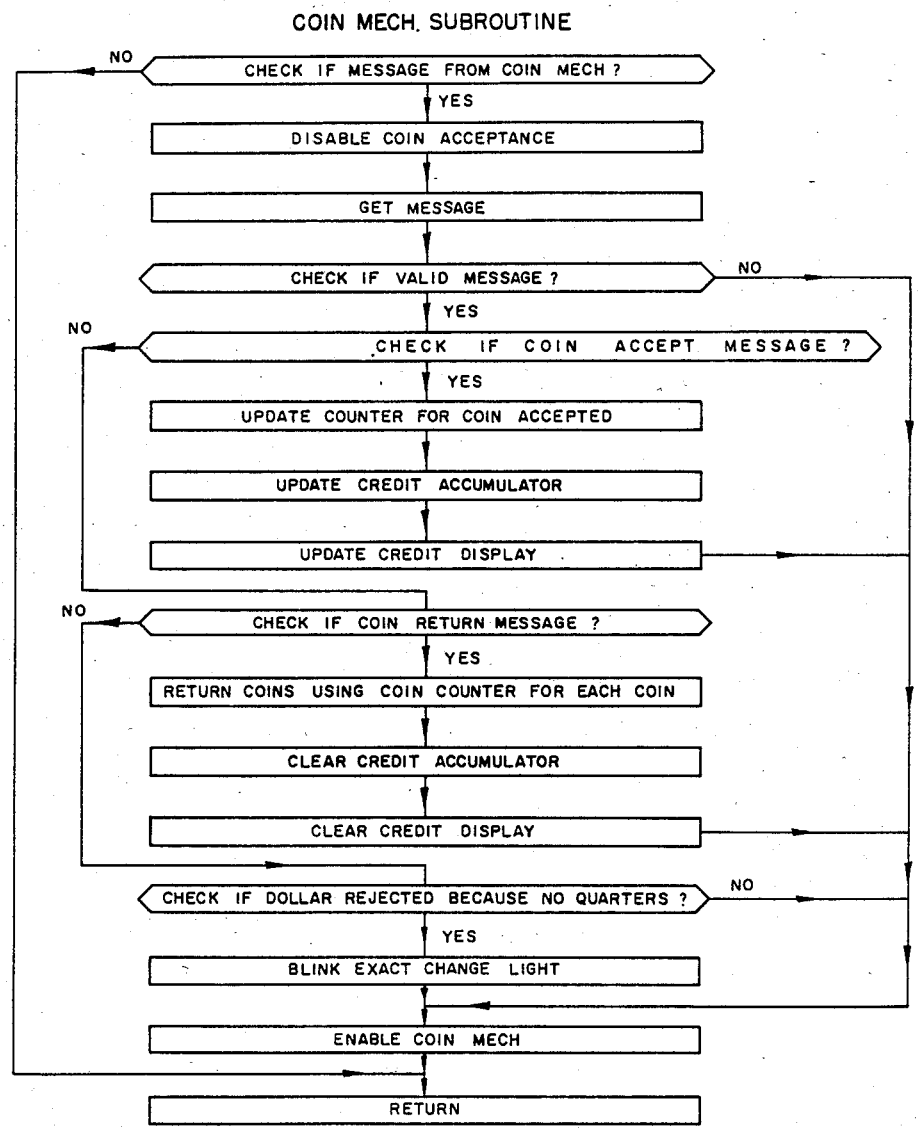
FIGS. 8, 9, 10, 11, 12, 13, 14, 15 and 16 are logic flow diagrams of subroutines utilized in the main program of FIG. 7 including respectively a coin mechanism subroutine, a selection switch subroutine, a payout switch subroutine, a test vend subroutine, a set price subroutine, a set special subroutine, subroutine A of the set special subroutine, a room light subroutine, and an alarm subroutine.

After the initialization of the logic, the coin mechanism subroutine illustrated in FIG. 8 is called up by the program. The coin mechanism subroutine checks the interrupt line at pin 1 of the processor 16 from the coin mechanism to determine if a signal thereon indicates the coin mechanism has encountered some type of activity. A lack of a signal thereon causes the processor to skip the subroutine and return to the main program. A signal thereon indicates that the coin mechanism has encountered some customer activity, either in terms of an inserted coin or a triggering of the coin return mechanism.

The presence of a signal on the interrupt line causes the processor to access the data line on pin 38 to step the serial message thereon into the processor. The processor next checks the message for its validity, noting that in a preferred embodiment one bit of the message is always a zero, and that after the message is stepped into the processor the signal on the interrupt line should return to zero. If the message indicates a coin has been deposited, a counter in the processor is updated to reflect the amount deposited, and the credit display is then activated by the processor to reflect the deposited amount.

If the message does not indicate a coin has been deposited, the processor rechecks the message to determine if it indicates the coin return mechanism has been actuated. If so, the processor directs the coin return mechansim to return the denomination of coins which have been received as determined by the credit accumulator totals for each type of coin (nickels, dimes, quarters). After a coin is returned, the credit accumulator total is decremented to indicate the lesser credit, and all coins are returned in this manner and the credit display cleared. The coin mechanism is then enabled to allow the machine to function in a normal manner again.

If the recheck of the coin mechanism message indicates the coin return was not triggered, the processor rechecks the message to determine if the coin mechanism has rejected the deposit of a dollar coin because it does not have four quarters therein to return if the coin return mechanism is later actuated. This is a particular feature of the type of coin mechanism, commercially available from Mars Money Systems, utilized in the preferred embodiment described herein. If a dollar was rejected as indicated, the processor causes the exact change light to blink and reenables the coin mechanism to allow the machine to operate in a normal manner. The coin mechanism subroutine then returns the processor to the main program, which next calls the selection switch subroutine as indicated in FIG. 7.

Figure 9:
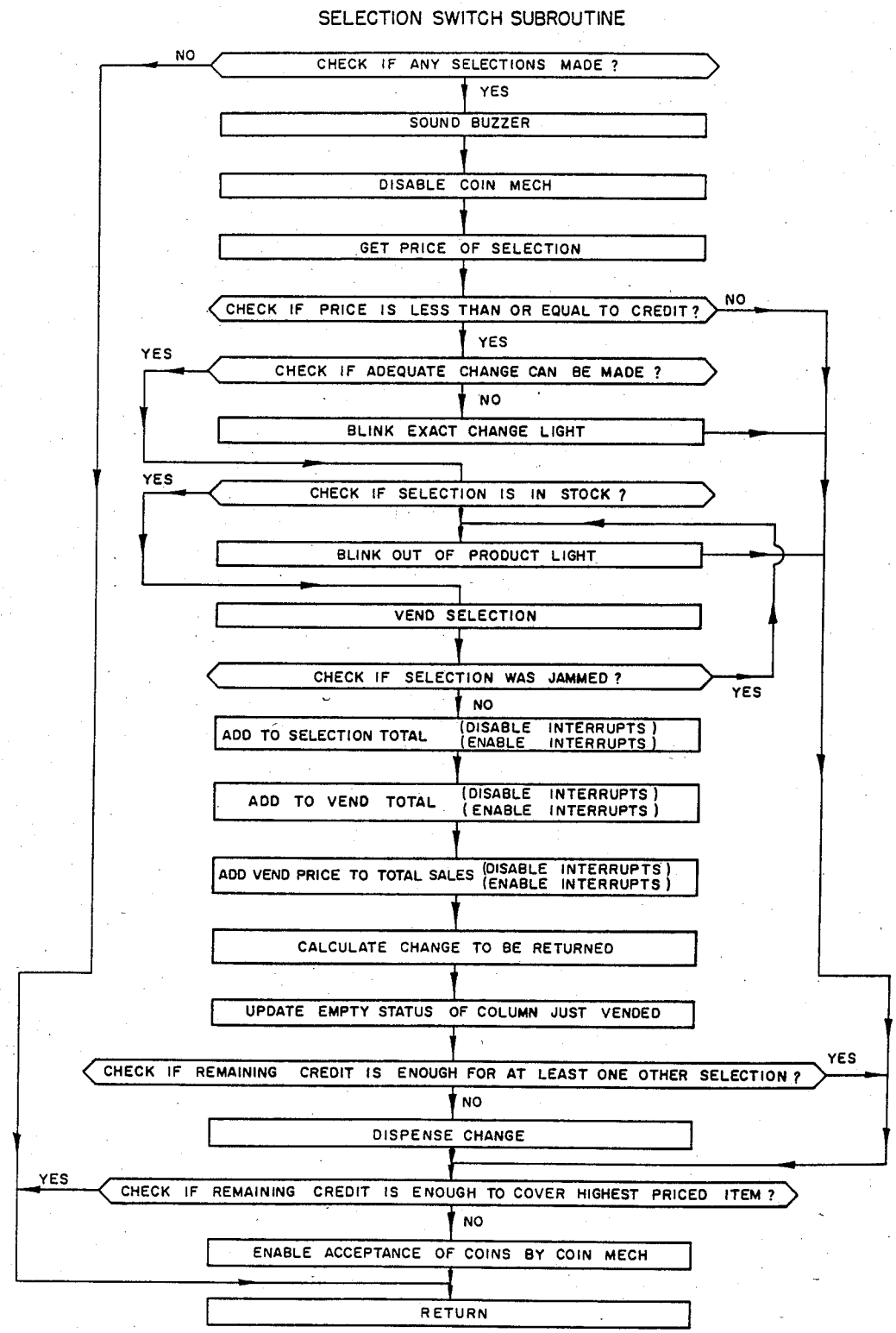

The selection switch subroutine is shown in FIG. 9, and initially checks the serial data from touch panel 12 which has been stepped through shift registers 14 and 20 to determine if a vend selection has been made by a customer. If so, a buzzer in the machine is briefly sounded, the coin mechanism is disabled, and the retail price of the particular selection is retrieved from memory in RAM 46 in which it had been previously entered in a manner as will be described, infra. The processor then checks the credit accumulator totals to determine if the price is less than or equal to the credit available in the machine. If not, the subroutine jumps to near the end thereof to enable the coin mechanism to allow it to receive additional coins. If so, the processor next checks to determine if adequate change can be made, and if not causes the exact change light to blink. If adequate change can be made, the processor checks to determine if the selected product is in stock. This check is made in the following manner.

The dispensing solenoid for the selected product is actuated by the processor with an electrical pulse having a relatively short time duration (e.g. 8 milliseconds) which is sufficient to cause current to flow therethrough if the out-of-product switch is closed, thereby indicating the presence of product for a vend, but is insufficient in duration to cause an actual vend operation by the vend solenoid. The current detecting circuit 32 indicates to the processor the presence of absence of current therethrough, thereby indicating to the processor whether or not the chosen product is out-of-stock.

If the chosen product is out-of-stock, the processor causes the out-of-product light to blink, and cycles to near the end of the subroutine. The processor will then cycle through the main program again to enable the customer to have a second vend choice. If the chosen product is in stock, the processor then actuates the proper vend solenoid, as discussed supra, to cause a vend of the selected product. If the vend solenoid is jammed, the characteristic current therethrough, which is initially high and then drops to a steady state value, does not decrease from the initial high magnitude, and the output of the current detector 32 as a function of time indicates to the processor whether or not the vend solenoid is jammed. If the solenoid is indicated to be jammed, the processor treats this as an out-of-product condition by returning to an earlier portion of the subroutine.

If the product is vended properly, tne interrupts to the processor are disabled prior to incrementing by one unit the vend total in memory for that particular selection. After incrementing the total by one unit the interrupts are then enabled again. This same sequence of disabling the interrupts, changing the total in memory, and enabling the interrupts is carried out for the three steps in the subroutine wherein the selection total, vend total and total sales in memory are incremented to reflect the vend transaction. This sequence of disabling interrupts, changing memory totals and enabling interrupts allows the processor to ensure that a power supply interruption in the midst of a memory change will allow the totals in memory to be incremented in the event of a power failure without danger that the failure will cause an incorrect total in memory. Stated differently, the interrupts occasioned by a power supply failure are arranged such that the power failure will not interrupt the incrementing process in the middle thereof.

After the vend price is added to the total sales in memory, the processor calculates the change to be returned to the customer. The column of product just vended is then retested for an out-of-product condition, in the same manner as explained supra, and if an out-of-product condition exists, that condition along with the time of occurrence thereof as measured by the processor clock 17 is recorded in memory such that a record history is maintained of the out-of-product conditions in the machine, along with the time of occurrence thereof.

The processor then determines if the credit available in the processor totalizers is sufficient for another vend, and if not directs the coin mechanism to dispense the available credit. If the available credit is sufficient for another vend, the change dispensing step is omitted in favor of a calculation to determine if the credit total is sufficient to cover the highest price item. If not, the coin mechanism is then enabled to allow additional coins to be accepted. If the credit total in memory is greater than the highest price item, the enablement of the coin mechanism is skipped, and in either event the processor returns to the main program.

The normal coin acceptance and return and product selection portions of the program have already been described, and the remaining subroutines are nonroutine vending programs that are always a portion of the main program, but are utilized mainly intermittently in nonroutine functions of the machine.

It should be appreciated that the processor and main program described herein enable the processor to cycle completely through the main program in approximately ten milliseconds so that the inclusion of these nonroutine functions in the main program still allows the processor more than sufficient time to accommodate normal vend functions. The processor continues to cycle through the main program during time periods when no vend activities are occurring, and keeps cycling in a routine manner until some vend activity triggers a different function in one of its subroutines, for instance the receipt of a message from the coin mechanism indicating some activity at that mechanism.

Figure 10:
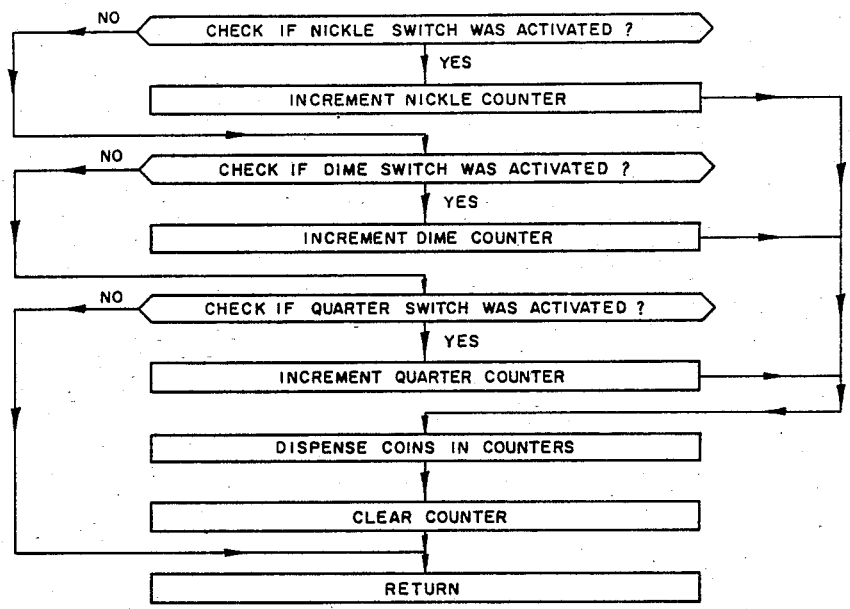

The payout switch subroutine is a program designed for service personnel, and is illustrated in FIG. 10. The service program is controlled by the nickel, dime and quarter switches SW1 and SW2 which are accessible only to a service person to allow him access to the coins in credit. Switches SW1 and SW2 have three switch positions as illustrated in FIG. 2. The middle switch contact position, in which pins 14 and 15 remain at +5 volts, may be considered the neutral position of the switch. Movement of the switch contact to the switch terminals to which pins 14 and 15 are connected results in grounding of those pins, and controls the payout of nickels and dimes as described herein. In a similar manner, one of the three positions of switch SW2 is utilized to control the payout of quarters in this subroutine.

Referring to FIG. 10, if the nickel switch is activated the nickel counter is incremented one count and the nickel dispensing solenoid actuated to dispense a nickel, and this operation is repeated until all the nickels in credit are dispensed and the nickel counter total in memory is cleared. The subroutine then performs essentially the same functions in sequence for dimes and quarters which allows the serviceman to empty a machine of all coins in credit. The subroutine then returns the processor to the main program.

Figure 11:
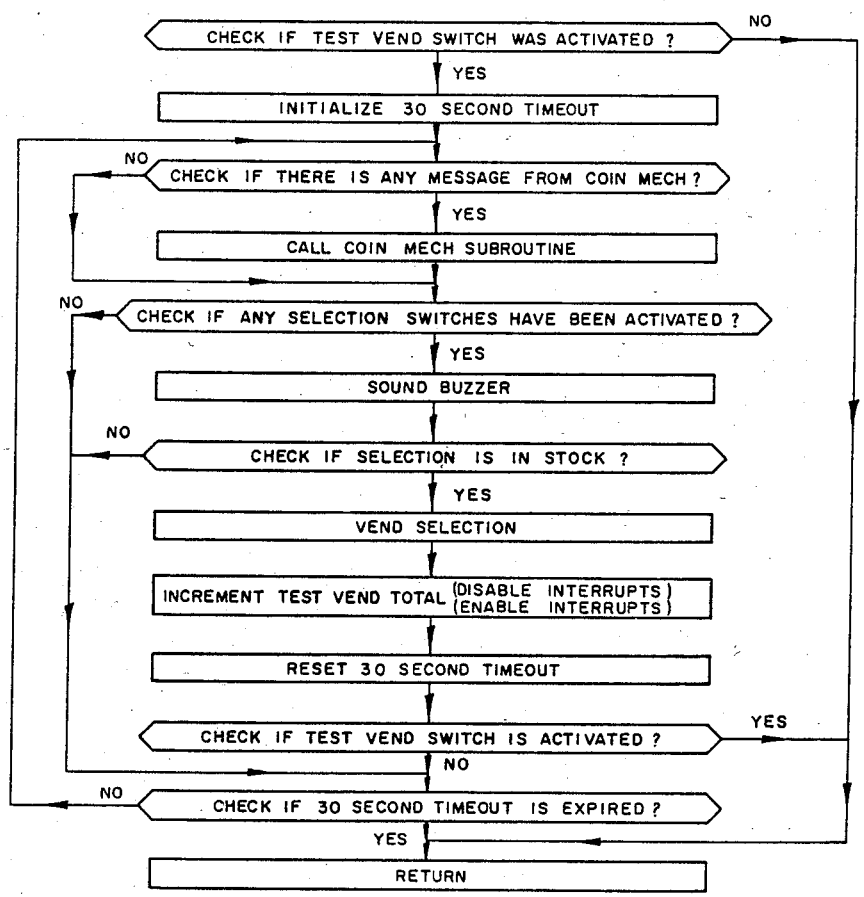

The test vend subroutine is also a program designed for service personnel, and is illustrated in FIG. 11. One of the positions of switch SW2 activates this subroutine, otherwise if the test vend switch is not actuated the subroutine skips right to its end and returns the processor to the main program. Actuation of switch SW2 to the test vend position by service personnel initializes a thirty second timed period at the end of which the processor automatically leaves this subroutine and returns to the main program unless the timed period is reset in the subroutine as explained infra. This thirty second timed period is provided so as not to allow a serviceman to accidentally leave the vending machine in the test vend mode wherein the machine could be emptied of product without the insertion of coins therein. After initialization of the thirty second timed period, the processor checks the coin mechanism for a message, and if one is present calls the coin mechanism subroutine from memory for performance of that subroutine. If no message is present from the coin mechanism, or after performance of the coin mechanism subroutine, the processor checks the selection switches to determine if any have been activated. If not, the processor jumps to the end of the subroutine and returns to the main program after expiration of the thirty second timeout period. If a selection switch has been activated, the vend buzzer is sounded, the in-stock status of the selection is checked and the selection is vended, all in a manner similar to that described in the Selection Switch Subroutine.

A record of the number of test vends performed is maintained in RAM 46, and this total is then incremented. The interrupts for the processor are first disabled before this incrementing action and then enabled thereafter, in a manner similar to that described with respect to the Selection Switch Subroutine, to prevent a power failure from causing an erroneous entry. The thirty second period is then reset and the processor again checks the status of the test vend switch. Activation thereof causes the processor to cycle to the end of the subroutine and return to the main program. If the test vend switch is not activated, the processor checks to see if the thirty second timeout period has expired. If not, it returns to the initial stages of the subroutine to allow another test vend if desired, etc. At the end of the thirty second timeout period, the subroutine automatically returns the processor to the main program.

Figure 12:
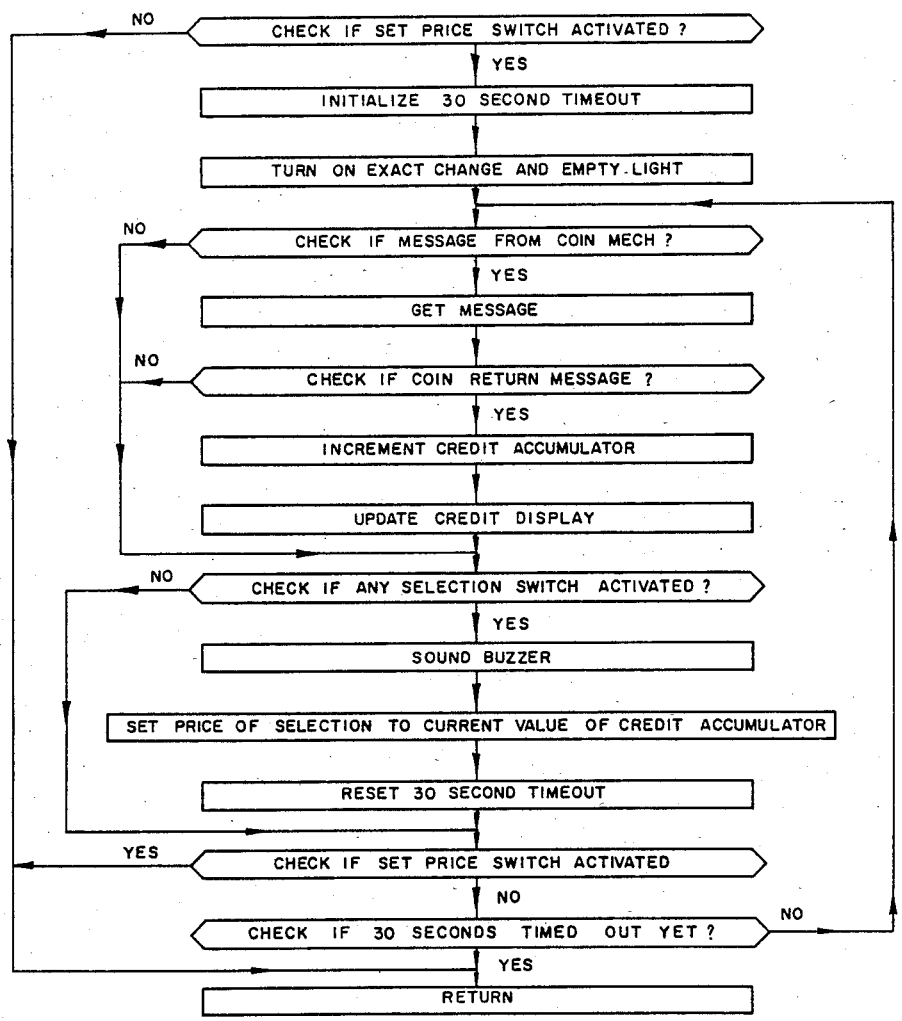

The set price subroutine is another subroutine designed entirely for service personnel, and is illustrated in FIG. 12. One position of the third switch SW3 activates this subroutine in a manner similar to the activation of the Payout Switch and Test Vend Subroutine. The processor then initializes a thirty second timeout period to automatically return the processor to the main program after a thirty second period, such that the serviceman cannot accidentally leave the machine in this mode, in a manner similar to the Test Vend Subroutine. The processor then turns on the exact change and empty lights to alert the service person to the fact that the machine is in a special mode.

Briefly, in summary this subroutine allows the service person to increment the amount shown on the credit display by five cents each time he activates the coin return mechanism until a desired vend price is displayed therein. The service person then actuates each selection switch for products to be sold at that retail amount, and this action then sets the price for each product in memory in RAM 46 until the price is reset. The amounts in RAM 46 are then utilized in the Section Switch and other Subroutines as described in relation to those programs.

In greater detail, returning to this subroutine, the processor checks for a message from the coin mechanism and if a message is present, serially steps it into the processor. The processor then checks the message to determine if the coin return mechanism has been activated as, in accordance with the brief description above, this is the only type of message from the coin mechanism that is of interest in this subroutine. If the coin return was activated the credit accumulator is incremented by five cents, and the circuit display is updated. The processor then checks the serial data from the selection switches to determine if a switch has been activated, and if so sounds the buzzer and inserts the purchase price for the actuated selection switch.

The thirty second timeout period is then reset to allow the insertion in memory of prices for other selections if desired. The processor then checks the set price switch to determine if it has been activated again, and if so jumps to the end of the routine and back to the main program. If not, it checks to see if the thirty second timeout period has expired, and if not returns to an earlier portion of the subroutine to allow additional vend prices to be inserted into memory. If the thirty second period has expired, the processor returns to the main program.

Figure 13:
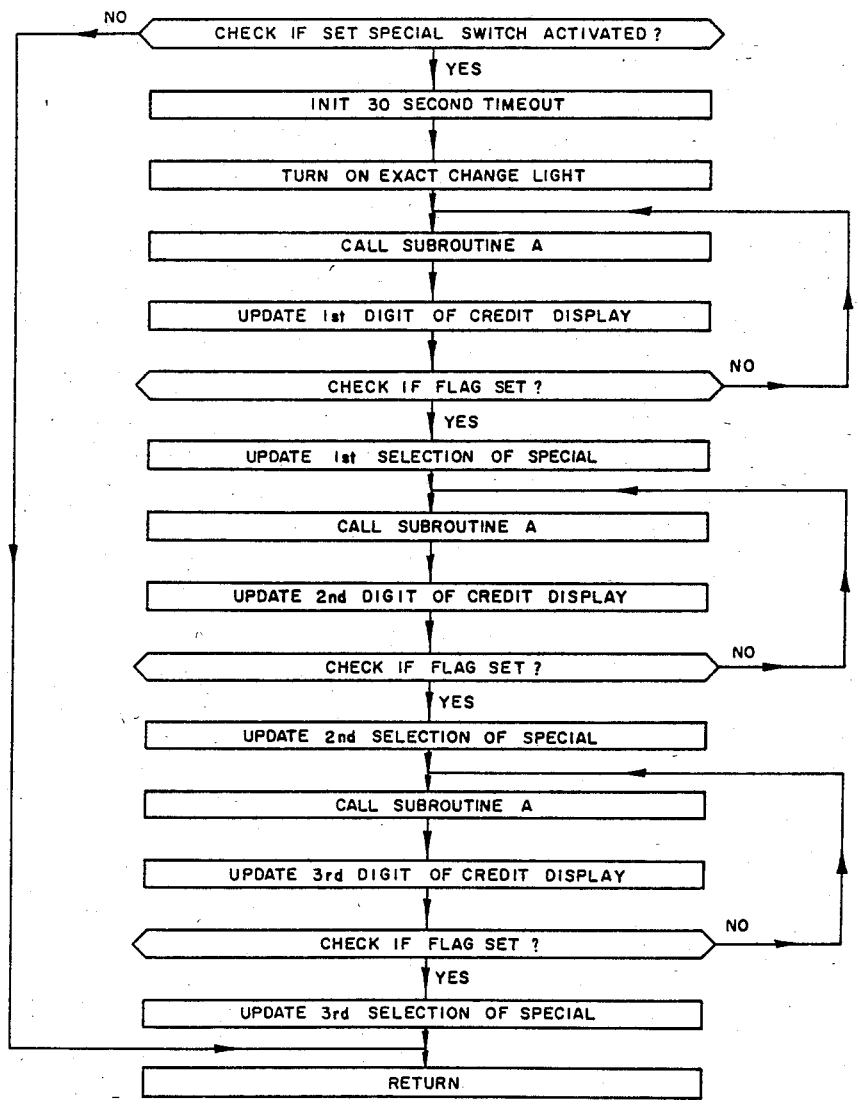
Figure 14:
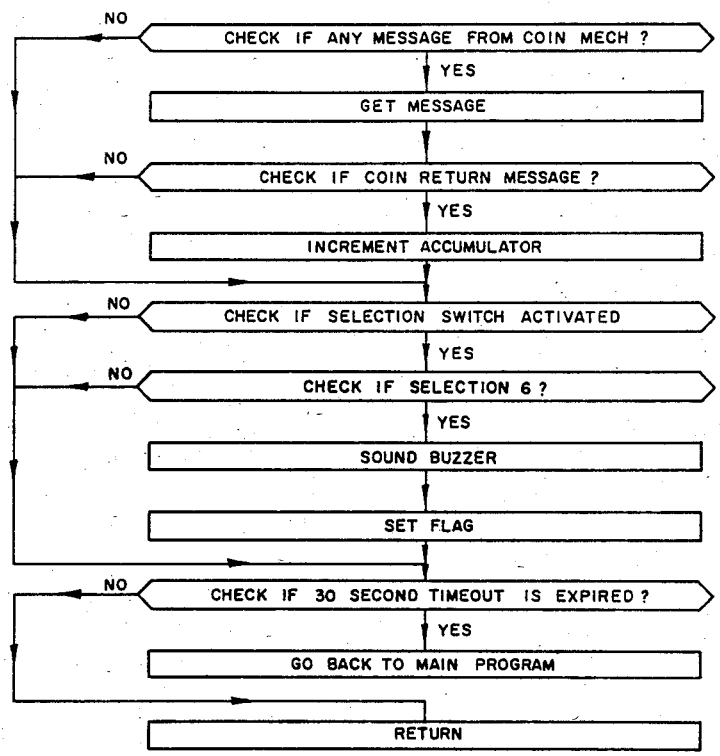

The Set Special Subroutine is another program especially for service personnel, and this program is called out or activated by one switch position of Switch SW3. The Set Special Subroutine is illustrated in FIG. 13, and allows the machine to vend a special, as explained in greater detail infra, such as three selections for the price of two, three selections at a reduced price, etc.

Briefly, this Subroutine identifies up to three types of products identified with three selection switches in the machine and causes the vending of each when the customer actuates the Special switch. In the preferred embodiment disclosed herein, the sixth selection switch of the capacitive panel is the Special switch. The total price for the Special is set in accordance with the Set Price Subroutine, during which the service person actuates the sixth selection or Special switch to set the vend price for the Special. In this Subroutine the selections associated with the Special are identified by selection switch number, and the service personnel inserts them in memory in RAM 46 in a manner similar to the manner in which the vend price is placed in memory. In this subroutine each of the three digits of the credit display is associated with a selection switch number, and each digit of the display may be incremented by actuation of the coin return mechanism.

In greater detail, activation of the set special switch SW3 initiates a thirty second timeout period, for reasons similar to those explained already, and the processor then turns on the exact change light to alert the service person that the machine is in the Set Special mode. The processor then calls the further Subroutine A, illustrated in FIG. 14, for execution thereof. In accordance with Subroutine A, the processor checks for a message from the coin mechanism, and if one exists serially steps it in. If the message reflects actuation of the coin return, a counter is incremented (e.g. from 0 to 1, or from 1 to 2, or from 2 to 3, etc.). The processor then checks if a selection switch was activated, and if so checks again to determine if it was the sixth or Special selection switch. If yes, it sounds a buzzer and sets a data flag, referred to supra. The processor then checks to see if the thirty second timeout period has expired, and if not returns to the Set Special Subroutine. The first digit of the credit display is then updated to reflect the incremented count in the accumulator. The processor then checks to determine if the data flag was set (by pressing selection switch six in Subroutine A as described). If not, it returns to the subroutine, wherein the count in the accumulator may be incremented one more time as just described. If the data flag was set, it indicates that the service person wants the total in the accumulator to be entered as the selection number for the first item of the Special. Accordingly, a set data flag causes the total in the accumulator to be entered in memory in RAM 46 as the first item in the special.

The Set Special Subroutine then recalls Subroutine A for the second item in the special, associated with the second digit of the display. The operations of the previous paragraph are then repeated, as shown in the middle portion of FIG. 13, for the second item of the display, and are also repeated for the third item of the special, as indicated near the end portion of FIG. 13. If the Special included only two items, the third digit of the credit display might be set as zero. Alternatively, the second and third digits of the credit display might be set to zero in this subroutine, in which case selection switch six becomes in essence an ordinary vend button, causing the dispensing of only one item of product. At the end of the Set Special Subroutine the processor is returned to the main program. In a variation of Subroutine A, the thirty second timeout can be reset after the accumulator is incremented and the data flag set, which would give the service person more time to execute the entire Set Special Subroutine.

Figure 15:
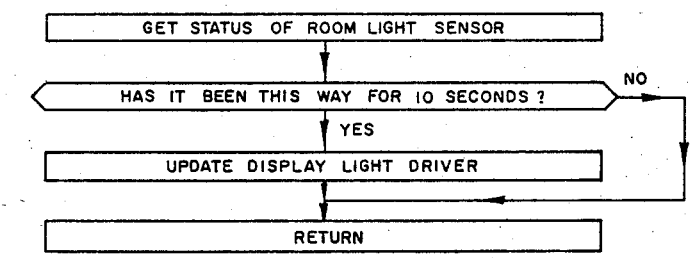

FIG. 15 is a Room Light Subroutine, which is controlled by the position of the fourth switch SW4. Switch SW4 controls the illumination behind the front panel of the vending machine. The illumination can be turned on all of the time, off all of the time, or can be controlled by the ambient light incident on photodetector 22, depending upon the position of switch SW4 as explained supra. If the ambient light controls the front panel illumination, the status of the light sensor, one or zero, as stepped into shift register 20 on pin 13, is checked. If the status has remained unchanged for ten seconds, the status of the display is updated. If not, the Subroutine merely returns to the main program. As explained supra, the front panel illumination is controlled by the processor through pin 22 of the port expander, and isolator 31 and its associated triac driver.

Figure 16:
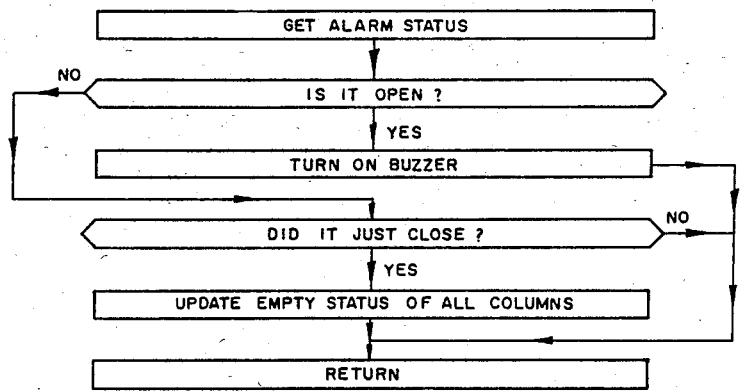

FIG. 16 is an Alarm Subroutine, which is controlled by the position of a security switch on the access door to the vending machine. The status of the alarm switch, opened or closed, is stepped into the processor by pin 11 on shift register 14. If the alarm switch is open, indicating the machine is open, the vending machine buzzer, which is the same component used in the Selection Switch Subroutine, is actuated. The vending machine may include a further switch to turn the buzzer off while the door is open. If the alarm switch has just closed, normally indicating a service person has just finished servicing the machine, the status of all of the vending columns is checked and placed in memory in RAM 46. The status of each vending column is checked with a brief electrical pulse directed to the vending solenoid therefor, as described in connection with the Selection Switch Subroutine.

While a preferred embodiment has been described in detail, it is apparent that many modifications and alternative embodiments may be constructed. For instance, the vend solenoids may be replaced by vend motors. The programs herein are subject to considerable modification in terms of the number of redundant signals which must be recorded before a signal is accepted as valid. This is true of the input into shift register 16 as well as various signals that are counted and compared herein. From the foregoing it is apparent that the objects of the present invention have been fully accomplished. As a result of the present invention, a new control circuit for a vending machine has been provided. Although a preferred embodiment of the principles of this invention has been described and illustrated in detail herein, it should be realized that the same are not limited to the particular configuration shown in the drawings, and that modifications thereof are contemplated and can be made without departing from the broad spirit and scope of this invention as defined in the appended claims.

I claim:

1. A vending machine for vending of products to customers during vending operations and having a plurality of control switches on a control panel for allowing customers to operate the machine during vending operations, including a plurality of product selection switches and a coin return switch, and a vending machine control circuit having logic means therein, including:

(a) a memory for storing data therein, including the vend prices of products offered for sale in the machine, and for also storing therein a vending program for controlling the operation of the vending machine during vending operations and also a servicing program for controlling the operation of the vending machine during vending machine servicing operations, including product price setting operations, performed by a service person;

(b) means for entering data into said memory, including a service switch accessible to a service person, and inaccessible to customers during vending operations of the machine, for calling from memory said servicing program which enables at least one of said control switches on the vending machine customer control panel to be used by a service person during vending machine service operation to enter data into memory, said control switches being utilized during said servicing program by utilizing said coin return switch to increment the price displayed on the available credit display each time the coin return switch is actuated by the service person, and utilizing the product selection switches to enter the price displayed on the available credit display into memory as the vend price for a particular product when the product selection switch for that product is actuated by the service person.

2. A vending machine for vending of products to customers during vending operations and having a plurality of control switches on a control panel for allowing customers to operate the machine during vending operations, including a plurality of product selection switches and a coin return switch, and a vending machine control circuit including logic means, coupled to said plurality of product selection switches and being responsive to actuation thereof, for controlling the vending of products by the generation of vend signals, said logic means including a processor having a vending program stored therein, and a random access memory for storing therein totals representative of the total number of vends of each product and totals representative of the cash received by the vending machine, further comprising means for entering data into said memory, including a service switch accessible to a service person, and inaccessible to customers during vending operations of the machine, for calling from memory a servicing program which enables at least one of said control switches on the vending machine customer control panel to be used by a service person during vending machine servicing operations to enter data into memory, said control switches being utilized during said servicing program by utilizing said coin return switch to increment the price displayed on the available credit display each time the coin return switch is actuated by the service person.

3. A vending machine, including a control circuit, as claimed in claim 2, said control switches being utilized during said servicing program by utilizing said product selection switches to enter the price displayed on the available credit display into memory as the vend price for a particular product when the product selection switch for that product is actuated by the service person.

* * * * *